Figure 1:
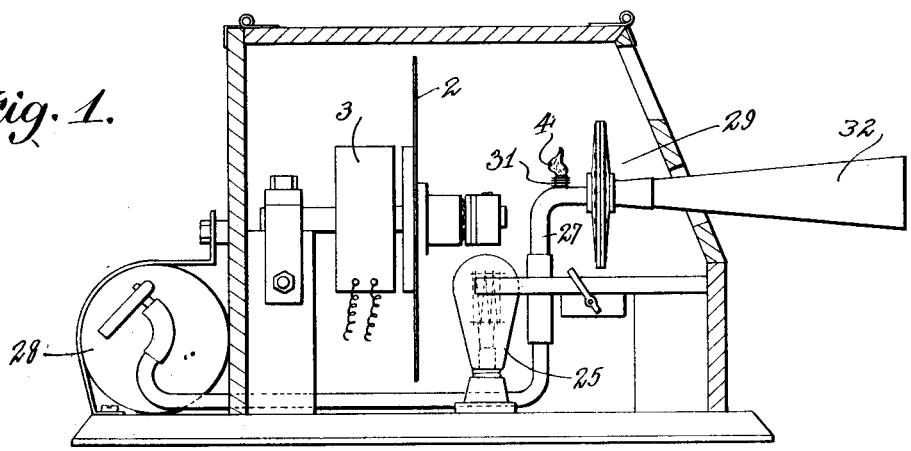

May 21, 1929.    M. A. LISSMAN    1,713,844
TONE ANALYZER
Filed June 11, 1927    2 Sheets-Sheet 1

Inventor
Marcel A. Lissman
By Lyon & Lyon
Attorneys

Inventor
Marcel A. Lissman
By Lyon + Lyon
Attorneys

Patented May 21, 1929.

1,713,844

UNITED STATES PATENT OFFICE.

MARCEL A. LISSMAN, OF STANFORD UNIVERSITY, CALIFORNIA.

TONE ANALYZER.

Application filed June 11, 1927. Serial No. 198,150.

This invention relates to apparatus for analyzing or determining the tone of musical notes.

An object of the present invention is to provide an apparatus for determining the pitch of a note by automatically physically indicating the pitch of notes sung or played.

The present invention is of use in singing practice. It prevents wrong intonation because it gives a vivid indication of the pitch of a note long before the average trained ear can detect an error. The present invention provides a means by which a student cannot sing off pitch without being immediately reminded thereof to correct himself. The invention also provides a means by which the ear soon learns to recognize very small variations in pitch. When a student endeavors to sing a musical phrase composed of a succession of distinct steps, he forms a very hazy mental picture of the exact tone which he endeavors to sing. This picture will not become clear until he learns to sing truer in pitch and he cannot sing truer in pitch until he forms clear mental pictures. To break this vicious cycle generally requires long training in various scale practice, the process being referred to as wearing the voice into place. By means of the present invention, a student is enabled to practice musical phrases with accuracy and pitch exceeding that of accomplished artists with years of training and this is accomplished without effort, the strain of trying to change subjectively the pitch of each tone sung being entirely eliminated. The mental picture of a note to be sung resulting from such practice is made very clear and a student soon gains confidence that he can reproduce the tone without appreciable error. Therefore, with the present invention, there is no need of slowly wearing the voice into place by scale exercises in order that the student may be able to sing a musical phrase without losing its meaning on account of gross errors in pitch. Moreover, the device of the present invention provides a means for giving a vivid indication of a thin tone by a weak indication of the analyzer while a rich tone having greater carrying power and a great deal of energy is vividly indicated to the student by a strong indication.

The present invention combines the employment of a tonal responsive light, such as a sensitive or manometric flame with a stroboscopic disc provided with sectors spaced in accordance with the diatonic scale.

Figure 4:
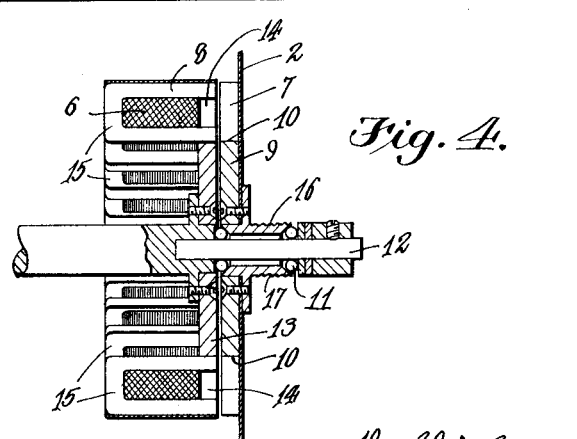
Figure 5:
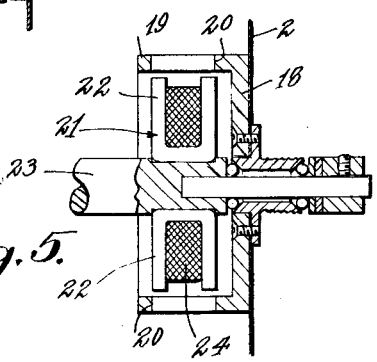
Figure 6:
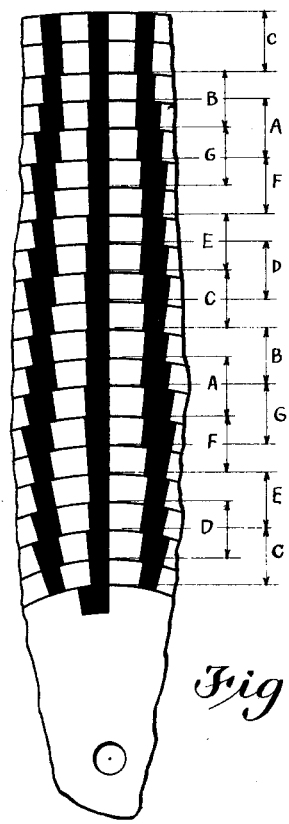
Figure 2:
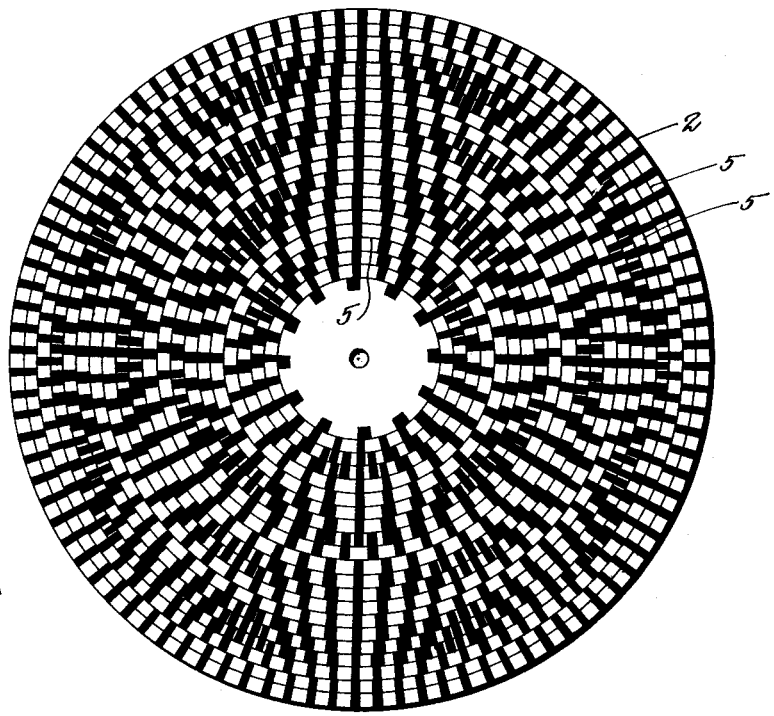
Figure 3:
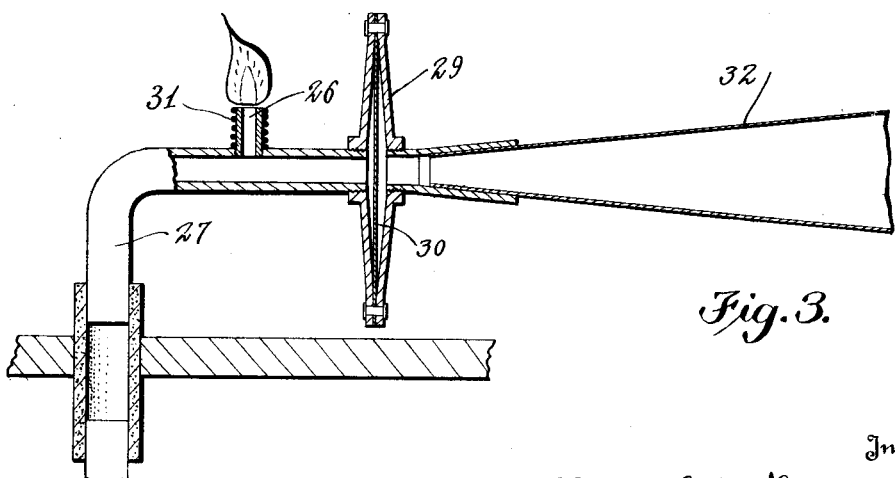

The present invention will be more thoroughly understood in connection with the description of a preferred form or example of a tone analyzer embodying the invention. For this purpose, reference is made to the accompanying drawings in which a preferred form or example of the invention is illustrated. In the drawings:

Figure 1 represents a digrammatic elevation, partially in vertical section of the assembled apparatus, Figure 2 is a plan view of the stroboscopic disc employed, Figure 3 is an enlarged elevation in vertical section of the tonal sensitive light, Figure 4 is an elevation in vertical section of a synchronous motor employed for rotating the stroboscopic disc, Figure 5 is an elevation in section of a modified form of motor, and, Figure 6 is an enlarged fragmental section of the disc with the rows marked to indicate the musical tones which they represent.

Referring to the drawings, the apparatus there illustrated is shown as comprising a stroboscopic disc 2 adapted to be revolved at constant speed by suitable means, such as a synchronous motor 3. Positioned in front of the stroboscopic disc is a tonal sensitive light 4.

Referring to Figure 2, the stroboscopic disc 2 is provided with a plurality of concentric rows of sector marks or indications 5, the number of dots in the successive rows being in the ratio of the frequencies of the tones of the diatonic scale. The disc is indicated as having sufficient marks to represent two octaves on the tonic scale, the inner row being the row representing the lower tone of the scale. The stroboscopic disc is also provided with means adapted to facilitate the location of the particular row corresponding to the particular tone to be sung. This is preferably accomplished by location of the whole and half tones in the scale so that when the disc rotates, it consists of alternately light and dark concentric rings, there being in succession from the interior of the disc outwardly two white, two dark, two white, three dark, two white, two dark, two white, three dark, and three white rows. The white rings are due to the presence in the scale of a half tone while the dark rings are due to whole tones. For this purpose, the tones of the diatonic scale are marked thereon as indicated in Figure 6, so that the whole tones overlap. It is thus made extremely easy to locate any particular note which it is desired to sing. Moreover, constructing the tone disc in this manner permits accidental half tones, sharps or flats, to be located without rendering the disc so complicated as to be difficult to decipher.

Another advantage of the construction of the tone disc thus described is that the indications occupy almost twice the space warranted by the size of the disc without any disadvantage because when one particular note is sung, the dots corresponding to an interval of a whole tone are not visible due to their rapid relative rotation. If a note corresponding to C sharp or D flat is sung, then the dots corresponding to C will appear to rotate rapidly in a clockwise direction while the dots corresponding to D appear to rotate in a counter clockwise direction. In the particular region common to both C and D, there is a pattern which appears stationary resulting from these opposite rotations. When the exact number of vibrations is not sung, then this pattern possesses apparent motion and the same cue can be used to correct the error, as in the case of regular notes of the scale actually appearing on the disc.

While the disc has a range of two octaves, indications on octaves higher or lower than the note sung can be used so the useful range on any one speed is four octaves. Thus, if there is provided means for rotating the stroboscopic tonal disc at two speeds, half and full speed, a total range of five octaves covering the full singing range is made available. In order that the tonal disc might be used for practice, it is required that at any one instant, it revolve at constant speed. It is not essential that the speed be absolutely the same from day to day but at a particular instant the student desires to sing a musical fifth, for instance, in which the ratio of the dots is exactly two to three, the tonal disc should not vary in speed at the same time. Preferably a single phase synchronous motor operating on alternating current mains is employed for revolving the tonal disc. The ordinary synchronous motor has many drawbacks which prevents its practical application to an apparatus of this kind. In prior forms of synchronous motors, a two pole type was employed, the difficulty of which resided in that it was extremely difficult to start, it being common to waste 15 or 20 minutes before the rotor could be locked at the synchronous speed. Moreover, the magnets required too much current, resulting in overheating of the motor if the motor was allowed to run for any length of time. The forms of synchronous motors employed having a greater number of poles and a number of poles corresponding to the projecting poles of the rotor cannot be made in small sizes on account of the winding of the poles become extremely expensive.

In Figure 4, there is shown a form of synchronous motor adapted to be easily started and to operate without excessive heating, which is extremely simple in construction. The feature of the present motor resides in the employment of a single coil 6 to energize all of the poles 7 and 8 of the rotor and stator, respectively. The rotor is formed of a flat disc 9 of insulating material, such as hard rubber, and is provided with a plurality of narrow slots 10 in its periphery, which slots are filled with iron laminations in sufficient number to make a force fit in the slots. This forms a rotor of very light construction. The rotor is indicated as mounted by bearings 11 upon the axle 12.

The stator is preferably formed of a disc 13 likewise of insulating material, such as hard rubber, and is provided with a plurality of peripheral slots 14 corresponding in number and size to the slots in the rotor. The slots of the stator are filled with U-shaped laminations 15 which surround the coil 6 and leave a gap in the iron circuit of the stator equal in length to the length of the laminations in the slots of the rotor. A small air gap such as about $\frac{1}{16}$ of an inch is left between the rotor and stator. When the rotor disc 9 is in such position that its laminations complete the iron circuit, then the magnetic circuit has a minimum reluctance and its pull is maximum. If, between two crests of the alternating potential, the laminations change place, the motor continues to run and develops considerable torque due to the slight phase displacement with respect to the symmetric condition which causes the pull helping the rotation when the laminations approach the poles in the stator to greatly exceed the pull hindering the rotation when the laminations leave the poles of the stator. The rotor disc 9 is mouned upon a drum 16 which is provided with a grooved surface 17 in which the cord may be wound for use in starting the motor. In Figure 4, the motor shown has an unbalanced axial pull which is not objectionable in smaller sizes but in larger sizes, might be objectionable. In larger sizes, a motor constructed as shown in Figure 5 might be preferred.

In Figure 5, the motor is indicated as provided with a rotor 18 having a cylindrical shell 19 with grooves 20 in its end which are filled with iron laminations to form poles. The stator 21 of the motor is formed by U-shaped laminations 22 having the piece of the U set in grooves in a cylinder 23, there being poles for the stator corresponding in number to the poles of the rotor.

A single coil 24 is positioned within the annular space formed by the poles of the stator.

Due to the light weight of both of the motors herein disclosed, the motor is adapted to run for long periods of time without appreciable wear or noise and with no tension. In order to start the motors, there is preferably provided a ballast resistance, such as an incandescent lamp 25 which after starting, reduces the power input to the motor. Such ballast resistance 25 is adapted to be switched into series in the running position and cut out in the starting position. The lamp 25 also serves as a means for facilitating the starting of the motor. The lamp 25 is normally burning when the motor is to be started, but out of the motor circuit. The inner circle on the tonal disc is employed for facilitating starting of the motor and is indicated for this purpose as provided with 12 marks. For a 60 cycle current supply, when the rotor turns 10 revolutions per second, there are 120 dots passing a given point at a second and as the lamp flickers at the same rate, these dots appear stationary. By means of a cord engaged in the grooves 17 of the rotor of a motor, the rotor may be spun to a rate higher than such a speed. When it slows down and the starting dots appear stationary, the switch is then thrown into running position and the rotor will lock at the synchronous speed. In this way, it is possible to start the motor about twice out of three trials or in 3 or 4 seconds. It is also possible to operate the motor at half speed, when it misses every other crest of the voltage wave. To start the motor at half speed, the operator waits until the rotor slows down and until the second row which has 24 dots appears stationary and then throws in the switch.

A synchronous motor does not automatically lock when rotated at higher speed than synchronous speed with the current on on slowing down to synchronous speed because the rotor has a velocity relative to synchronous speed and the torque given to the rotor when it approaches its position of symmetry, when added to its relative velocity, is sufficient to cause it to overshoot its position and ultimately stop. With the motor above outlined, in combination with the stroboscopic disc, it is possible to readily start the motor. When in running position, the reactance of the motor is such that the combined motor and lamp 25 does not take sufficient current to make the lamp bright. Therefore, the illumination from such lamp does not interfere with the action of the tonal sensitive light 2.

Combined with the stroboscopic tonal disc and constant speed motor is provided a tonal sensitive light or a light adapted to respond to tonal vibrations. The manometric flame or diaphragm is an example of a tonal sensitive light of this kind. Manometric flames or diaphragms heretofore employed are so constructed that any slight suspended pressure will cause the membrane or diaphragm to displace so much gas that the flame is extinguished. In such a case, it is extremely difficult to relight the flame. Therefore, in the present invention, there is preferably employed an improved form of manometric flame as the tonal light. Such flame is illustrated in Figure 3. Referring to said figure, 26 indicates the orifice of the flame which is connected with a line 27 leading to a gas supply, such as an acetylene tank 28. The line 27 also connects with a diaphragm chamber 29 in which is clamped a diaphragm 30. The air chambers on opposed sides of the diaphragm are extremely small in depth so that a small displacement of the diaphragm will cause large changes in pressure. For example, I preferably make the air chambers only $\frac{1}{16}$ of an inch in depth, or less. The diaphragm is thus made sensitive to sustain tones, but other disturbances such as breathing, coughing, and consonants do not greatly affect the diaphragm and will not operate to give such a surge of pressure as to extinguish the flame.

Means are also provided by which the flame will automatically relight, if extinguished. Such means comprise a coil 31 of iron, or other suitable material, wound a few times around the tip of the orifice 26. In operation, the top turn of such a coil is kept hot by the base of the flame and does not cool quickly because the heat must flow through a long distance of wire having only a small temperature gradient. The flame being fed by acetylene from tank 28 deposits a small layer of carbon on the coil 31 which becomes incandescent and remains so for a number of seconds after the flame has been extinguished. Hence, as soon as the gas is again emitted from the orifice 26, it is re-ignited by such incandescent carbon.

The diaphragm chamber 29 is connected at one side with a cone 32 into which the musical tones to be indicated are directed. Such cone 32 is preferably one having a relatively small taper, such as approximately 10 degrees. With a cone of this type, the energy of the tone remains substantially constant in passing to the diaphragm. The diaphragm 31 may be relatively thick and still respond readily to suspended tones directed in the cone 32 due to the large area in which the pressure is permitted to act upon the membrane or diaphragm 30. By this construction of the manometric flame, it is made sensitive to sustain tones but relatively insensitive to transients such as consonants like p, t, s, or breathing, and coughing. In such manner, therefore, the flame is not easily extinguished.

With the apparatus thus described, it is readily apparent that a tone directed into the cone 32 of the manometric flame will vibrate the flame in accordance with the pitch of the tone. The stroboscopic tone disc will then directly indicate the pitch of said tone as the row of marks corresponding to such pitch will apepar stationary to the operator. A slight variation from the true pitch of any tone is readily indicated by the appearance of the marks of such tone rotating in one or the other direction, depending upon whether the error in the tone is sharp or flat. By the apparatus thus described, the desired pitch of the tone may be readily determined.

While the form of the invention herein described is well adapted to carry out the objects of the present invention, it is understood that various modifications and changes may be made without departing from the present invention, and the present invention includes all such modifications, changes, and substitution of equivalents as come within the following appended claims.

I claim:

1. In a tone analyzer, a stroboscopic member graduated in the proportions of the diatonic scale, and a tonal sensitive light for illuminating the same.

2. In a tone analyzer, a stroboscopic member graduated in the proportions of the diatonic scale, a tonal sensitive light for illuminating the same, and means for driving the stroboscopic member at constant speed.

3. In a tone analyzer, a stroboscopic member graduated in the proportions of the diatonic scale, means on the disc for indicating the location of whole and half tones, and a tonal sensitive light for illuminating the same.

4. In means of the class described, a stroboscopic member, a synchronous motor for driving said member, and means for lighting such stroboscopic member actuated by the current supply for said motor.

5. In a tone analyzer, a stroboscopic member graduated in the proportions of the diatonic scale, and a manometric flame for illuminating the same.

6. In a tone analyzer, a stroboscopic member graduated in the proportions of the diatonic scale, a manometric flame for illuminating the same, and a synchronous motor for revolving such stroboscopic member.

7. A synchronous motor, comprising a stator, having a single axial coil, a plurality of U-shaped poles inclosing said coil and placed circumferentially apart around the stator, a rotor, having laminations circumferentially spaced therearound, actuated by said stator, said rotor being connected with a stroboscopic disc, and a light for illuminating said disc actuated by the alternating current supply for said motor.

8. A synchronous motor, comprising a stator, having a single axial coil, a plurality of U-shaped poles inclosing said coil and placed circumferentially apart around the stator, a rotor, having laminations circumferentially spaced therearound, actuated by said stator, a stroboscopic disc driven by said motor, and a tonal sensitive light for illuminating the disc.

9. A synchronous motor, comprising a stator, having a single axial coil, a plurality of U-shaped poles inclosing said coil and placed circumferentially apart around the stator, a rotor, having laminations circumferentially spaced therearound, actuated by said stator, a stroboscopic disc driven by said motor, a tonal sensitive light for illuminating the disc, and a light actuated by the current supply for said motor for illuminating said disc.

10. A manometric flame, comprising a flame orifice, a diaphragm connecting with a line leading to said orifice, and a metallic coil around the tip of said orifice.

11. A manometric flame, comprising a flame orifice, a diaphragm connecting with a line leading to said orifice, a metallic coil around the tip of said orifice, a stroboscopic disc illuminated by said manometric flame, and means for driving said stroboscopic disc.

12. A manometric flame, comprising a flame orifice, and a diaphragm disposed in air chambers of small depth, and connected to said orifice.

13. A manometric flame, comprising a flame orifice, a diaphragm disposed in air chambers of small depth and connected to said orifice, a stroboscopic disc disposed to be illuminated by said flame, and means for driving said disc.

14. In means of the class described, a manometric flame, having a flame orifice, a coil of wire surrounding the tip of said orifice, a diaphragm connected with said orifice and disposed within chambers of slight depth.

15. In means of the class described, a manometric flame, having a flame orifice, a coil of wire surrounding the tip of said orifice, a diaphragm connected with said orifice and disposed within chambers of slight depth, a stroboscopic disc illuminated by said flame, and means for driving said disc.

16. A stroboscopic disc, comprising a plurality of concentric graduations, the proportions of the graduations in the successive concentric circles being in the relations of the frequencies of notes of the diatonic scale, the graduations of the whole tones of the graduations representing the diatonic scale overlapping.

Signed at Palo Alto, California, this 1st day of June, 1927.

MARCEL A. LISSMAN.